June 8, 1965  H. B. FAKE  3,187,703
MOCCASIN TYPE SEAM AND METHODS OF INSERTING THE SAME
Filed Aug. 6, 1962  3 Sheets-Sheet 1

Inventor
Harry B. Fake
By his Attorney
Edward W. Fearing

June 8, 1965  H. B. FAKE  3,187,703
MOCCASIN TYPE SEAM AND METHODS OF INSERTING THE SAME
Filed Aug. 6, 1962  3 Sheets-Sheet 2

June 8, 1965  H. B. FAKE  3,187,703
MOCCASIN TYPE SEAM AND METHODS OF INSERTING THE SAME
Filed Aug. 6, 1962  3 Sheets-Sheet 3

United States Patent Office 3,187,703
MOCCASIN TYPE SEAM AND METHODS OF
INSERTING THE SAME
Harry B. Fake, South Weymouth, Mass., assignor to
United Shoe Machinery Corporation, Boston, Mass., a
corporation of New Jersey
Filed Aug. 6, 1692, Ser. No. 215,060
10 Claims. (Cl. 112—402)

The present invention relates to improvements in moccasin type seams and methods of utilizing the same in the manufacture of shoes, a machine for inserting such seam being disclosed in an application for United States Letters Patent, Serial No. 192,744, filed May 7, 1962, now Patent No. 3,081,719, granted March 19, 1963 in the name of the present inventor. The prior patent relates to a machine and method for inserting a seam similar to that of the present invention, so that in respect to the method of inserting the seam the present application is a continuation-in-part of the prior patent.

With the machine of the prior patent a moccasin type two-thread lock stitch seam is inserted, the threads of which are exposed on the finished grain surface of a shoe upper but which are concealed at the flesh or inner surface of the upper. By so doing the inner or flesh surface is not pierced by the seam, moisture or other undesirable material being excluded from the shoe while producing an ornamental appearance at the outside of the upper.

An important object of the present invention is to enhance the ornamental appearance of a moccasin type seam and to provide a method of inserting such seam, whereby various effects are capable of being produced without detracting materially from the durability and strength of the upper. While the invention is illustrated as being particularly useful in the manufacture of a shoe, similar benefits are obtainable wherever leather or similar materials are utilized in manufacturing procedures and to this extent the improved seam may be inserted to advantage as a design feature in upholstery, bags, or other articles where ornamentation is desirable.

As hereinafter illustrated, a two-thread lock stitch moccasin type seam is provided with threads entering and emerging from the one side of a work piece without intersecting or being exposed at the other side, the threads extending between the main body of the work piece and a series of shallow bridges running parallel to the length of the seam, each bridge being formed with a flat cut extending clear of one work piece surface but terminating in slits aligned with those of the other cuts and exposed at the other work piece surface and a loop in one thread is carried beneath the bridge where it is interlocked by the second thread, the interengaging portions of both threads then being brought beneath the width of the bridge to form with adjacent stitches a row of enlargements. By avoiding complete penetration of the material less distortion occurs when the material is stretched as in lasting a shoe upper than would occur with complete penetration and the threads are concealed at one side of the work.

It is within the scope of the invention to insert the seam in a manner to cause the threads to be exposed at either side of the work but not both sides. When the threads are exposed at the outer side of the work and uniformly tensioned between stitches the points of interengagement between the threads produce ornamental raised enlargements with wrinkled depressions between them in a characteristic manner. When the exposed threads appear at the inner surface of the work there are formed depressions marking the line of the seam and providing the only decorative effect outside. Such line of depressions is particularly advantageous for use with a shoe upper because of a puckering or wrinkling action produced by the threads, and for this reason the depressions are not as readily eradicated when tension is applied to the upper in lasting, as occurs if similar depressions are made merely by pressure or heat in an embossing machine.

In practicing the method of the invention a work piece is temporarily subjected to an abrupt angular bend along which there is split from the main body of the work piece a series of shallow bridges running parallel to the length of the bend, each bridge being formed by a flat cut extending clear of the work piece surface inside the bend, but terminating in aligned slits exposed at opposite sides of the seam outside the bend. For best results the flat cuts are spaced further from the side of the work piece not having the bridges. A loop of thread is drawn into the slit forming the cut with parallel portions lying in side-by-side relation one at each end of the slit and interlocked with a second thread outside each cut, after which the loop extending through the cut is retracted with the second thread until the interengaging portions of both threads are brought into a centralized position beneath the width of the bridge. The interengaging portions of the thread produce enlargements several times the normal thickness of one thread. In this way, uniformity of appearance is insured and the best structural results in the seam are obtained.

These and other features of the invention, as hereinafter described and claimed, will readily be apparent to those skilled in the art from the following detail specification, taken in connection with the accompanying drawings, in which:

Figure 1:
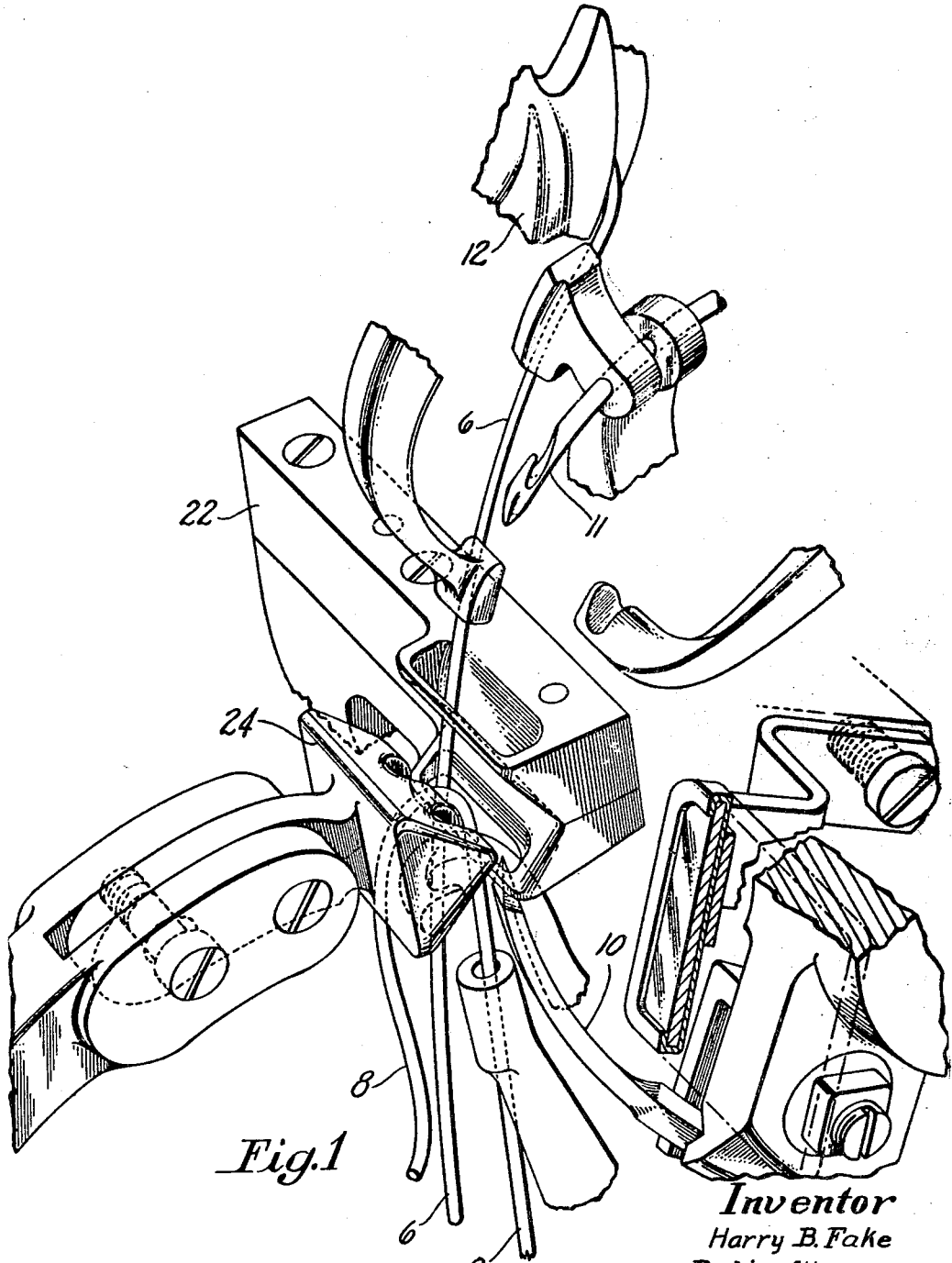
FIG. 1 is a perspective detail view, partly broken away and in section, looking from the right front of operating parts of a moccasin type two-threaded lock stitch shoe upper sewing machine, by which the seam of the present invention may be inserted.

The machine of the prior patent referred to is capable of operation upon upper leather or other equivalent material to form an ornamental two-thread lock stitch seam with the threads of the seam entering and emerging from the same side of the upper without being exposed at or intersecting the other side. When leather upper material is being operated upon by such a machine, it is usual to insert the seam with parallel threads exposed on the outer or grain surface of the upper and concealed from view by the main body of the upper on the inner or flesh side surface.

Most commonly, a shoe upper composed of leather has its finished grain and rough flesh surfaces 2 and 4 comprising respectively, an epithelial membrane and a loose mesh, felted layer of randomly oriented filaments bonded together. The grain surface 2 may be composed of the natural cuticle on the skin of an animal or it may be applied in the case of split leather as a synthetic coating of relatively stiff impervious substance embossed to imitate the natural cuticle. In any event the grain surface has a tendency to wrinkle and to stiffen the entire piece of leather whenever the leather is bent or twisted out of its natural shape, the grain surface 2 ordinarily being less pliant than the underlying felted layer. The same is true with artificially constructed materials having similarly finished or grained surfaces and relatively rough or porous surfaces at opposite sides.

As more fully disclosed in the prior patent, a two-thread lock stitch moccasin type seam is inserted by the machine of that patent with threads, as at 6 and 8, entering and emerging from the same side of the work piece, and extending between the main body portion of the felted layer and each of a number of shallow bridges, as at 9, running parallel to the length of the seam, the bridges being formed with flat cuts extending clear of the surface of the felted layer but terminating in slits exposed at the grain surface. As illustrated, the cuts are spaced further from the side of the work piece not having the shallow bridges to accentuate the ornamentation. For this purpose use may be made of a machine equipped with a curved awl 10, a curved hook needle 11 and a shuttle 12, shown herein.

Figure 5:
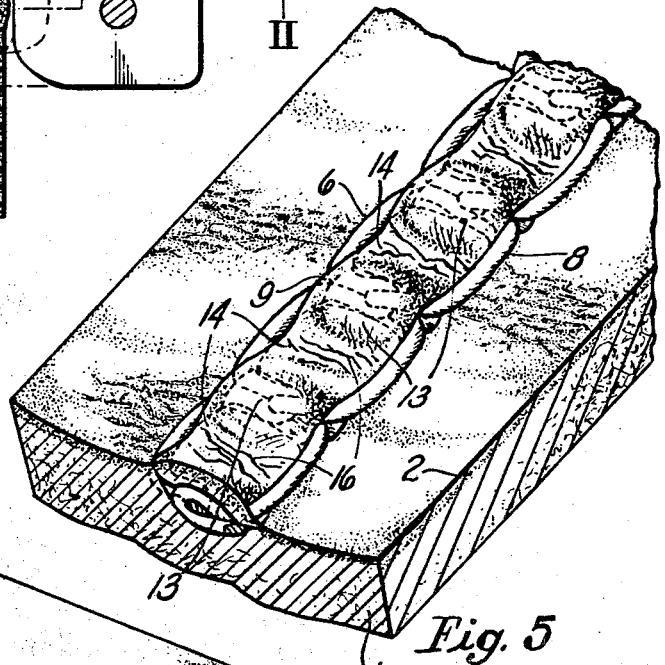
FIG. 5 is a perspective view of an ornamental seam inserted in the grain surface of an upper by the machine.

The ornamental seam produces enlargements 13 as shown in FIG. 5 of the present drawings by reason of the thickness of the interengaging portions of the thread loops and the tension applied to the thread beneath the bridges. There is a depression 14 produced by the tension on the threads between each pair of successive enlargements 15, so that the grain surface has produced on it wrinkled areas 16 within the depressions, the wrinkles forming a further decorative pattern in the seam.

Figure 6:
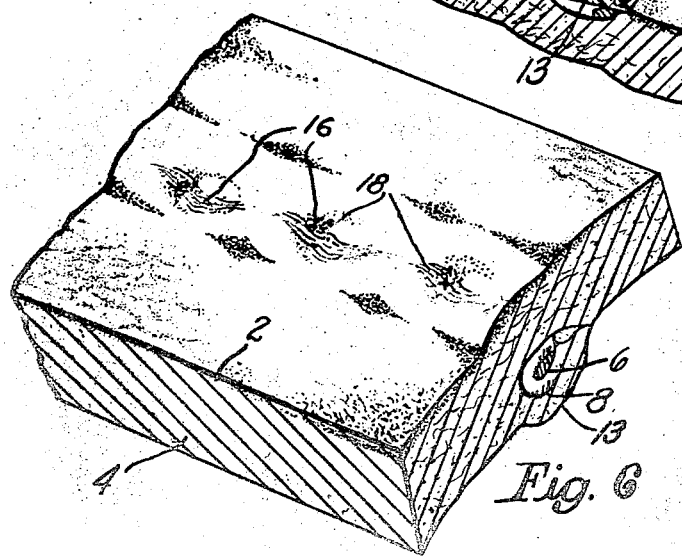
FIG. 6 is a similar view of a modified form of seam with the stitches inserted at the other surface of the upper.

In the modification of the seam illustrated in FIG. 6 neither thread 6 nor 8 is exposed on the grain or finished surface of the upper material. In this form of the invention the threads of the seam enter and emerge repeatedly from the flesh or unfinished felted surface and the only ornamentation exposed is a series of depressions 18 directly opposite the depressions 14 at the other side, the depressions 18 forming wrinkled areas at the finished grain surface 2 of the upper. Such ornamentation is distinct from that produced by compression marking with or without heat, since such marking does not produce wrinkles in the grain surface, the grain being stretched and tensioned to form the depressions and tending to remain in unwrinkled condition. Furthermore, if the upper material with marked indentations is stretched as in lasting the upper there is a strong possibility that the depressions will be reduced in depth and may even be eradicated entirely.

Figure 2:
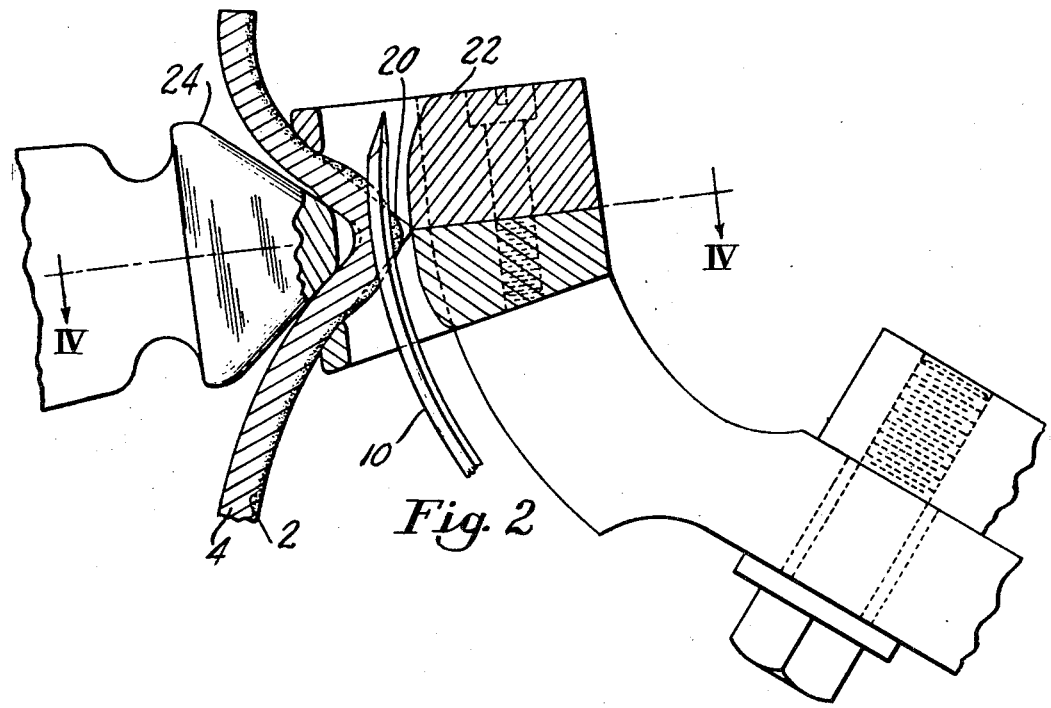
FIG. 2 is a view in right-side elevation, partly in section and on an enlarged scale, as seen from the line II—II in FIG. 4 of a work support and a presser for clamping a shoe upper in the machine of FIG. 1.

According to the method of inserting the seam and manufacturing a shoe with the threads 6 and 8 entering and emerging from one side of the work piece material without being exposed at or intersecting the other side, the machine acts, as more fully disclosed in the prior patent, first, to form in the work piece a temporary angular bend 20, as shown in FIG. 2, corresponding to the work engaging surfaces of a work support 22 and of a cooperating presser 24 for clamping the work during insertion of the seam. The work engaging surfaces of the work support 22 are displaced by an angle of 100 degrees. The work engaging surfaces of the presser 24 are separated by an angle of only 80°, so that the greatest pressure is exerted at the apexes of the angles on the work support and presser, thus gripping the bend 20 in the work piece material most securely along the line of the seam.

The awl 10 produces a flat cut in a curved path while forming the bridges 9 and safely approaches the inside surface of the bend in the work piece more closely without danger of penetrating it than would be possible with a cutting tool which is forced in a straight path through the material. Furthermore, the bend in the material of the upper is substantially sharper with a smaller angle between the sides than is possible with other types of machines now available or by hand, so that advantages of greater character in the seam result from the use of the machine discolsed in the prior patent, especially when it is desired to make very shallow bridges in the material by forming the cut farther from the side of the work piece not having the bridges. Thus, when the upper is removed from the machine after the seam is completed the bend in the upper is then straightened out to a large extent and the threads 6 and 8 in the seam tend to curve more sharply and to have applied to them heavier tension than when they were inserted. It is for these reasons that the depressions 13 are formed in the side of the material opposite that at which the threads are exposed.

To interlock the threads of the stitches a first loop of needle thread 6 is drawn through an arcuate cut with parallel portions lying in side-by-side relation and the second locking thread 8 is passed through the loop outside of the cut. Thereafter, the loop first formed is retracted into the cut beneath a bridge 9 until the interengaging portions of both threads are brought into centralized position beneath the width of the bridge. In straightening out the bend 20 in the upper, rows of depressions 14 and 18 are formed, each depression 14 at one side being formed directly opposite a depression 18 at the other side. The depressions formed in the grain surface of the leather material produce the most pronounced areas 16 of wrinkling. For this reason the decorative effect of the depressions is greater when the upper becomes completely flattened, so that for the best results the grain surface of the leather is exposed outside the shoe rather than inside, especially with the seam also inside, although desirable results are obtained even when the felted or flesh surface of the upper is exposed outside the shoe.

Figure 3:
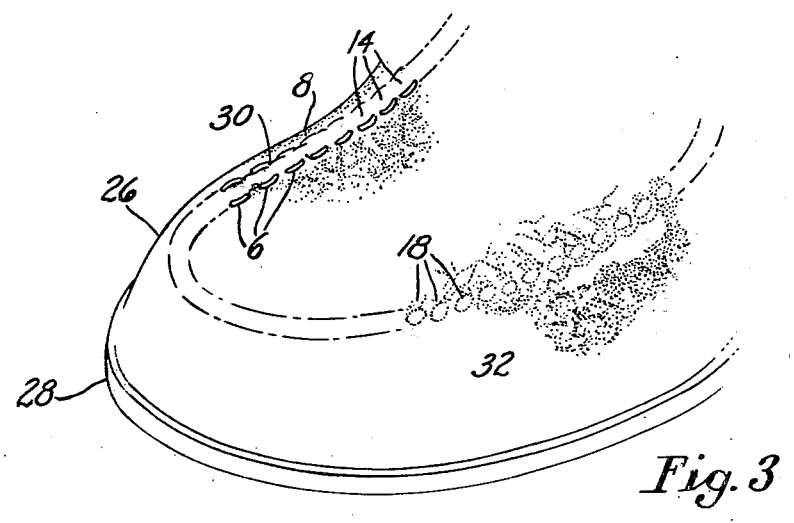
FIG. 3 is a perspective view of a completed shoe, in the upper of which there has been inserted portions of two different types of seams embodying the features of the present invention.
Figure 4:
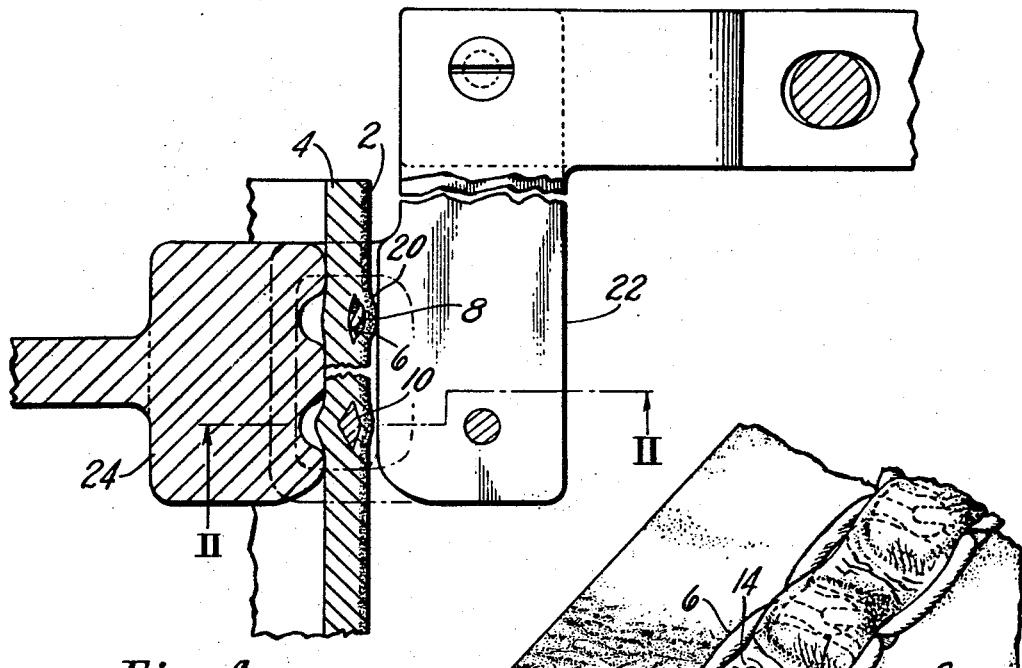
FIG. 4 is a sectional plan view, partly broken away to reduce one dimension, as seen from the line IV—IV of FIG. 2.

The ornamental design of either the seam of FIG. 5 or of FIG. 6 may readily be appreciated from the appearance of the shoe illustrated in FIG. 3. In this figure a toe portion of a completed shoe is shown, in which an upper 26 has secured to its bottom surface an outsole 28. At the left side of the figure is a portion of a seam 30 corresponding to that of FIG. 5. At the right side of the figure is illustrated a seam 32 corresponding to that of FIG. 6. In the case of either seam the benefits of the decorative action are maintained without danger of structural damage or weakness in the upper from excessive pressure or heat, as with conventional marking or embossing procedures. The ornamental effect also is more permanent than with marking procedures, particularly if use of the shoe subjects it to unusual quantities of moisture or scuffing. Furthermore, the ornamentation of the present invention is more quickly applied to a shoe upper and is more readily adapted for different sizes or styles of shoes than with prior methods of ornamentation involving marking or embossing.

It should be understood also, that the purpose of straightening out the shoe upper or other work piece is to remove the tendency of the upper to retain its temporarily bent condition with a continuous ridge of unbroken cross section along its length, which might prevent the formation of depressions and enlargements. For the best results the work piece is so straightened that the enlargements, as well as the depressions appear at both sides, there being no elongated ridge or continuous concavity at either side.

The nature and scope of the invention having been indicated, and an embodiment of the invention with preferred steps of insertion having been particularly described, what is claimed is:

1. A two-thread lockstitch moccasin type seam having threads entering and emerging from the same side of a work piece and extending between the main body of the work piece and each of a number of shallow bridges running parallel to the length of the seam, the bridges being formed with flat cuts extending clear of one work piece surface and terminating in aligned slits at the same work piece surface and the threads of the seam passing beneath the bridges in side-by-side relation with exposed portions of the same thread running from each slit, in combination with enlargements along the line of the seam formed by interengaging portions of the threads beneath the bridges.

2. A two-thread lock stitch moccasin type seam, as in claim 1, in which the enlargements are disposed in a uniform row at central positions widthwise of the bridges.

3. A two-thread lock stitch moccasin type seam, as in claim 1, in which the work piece is formed with finished grain and unfinished felted surfaces and a series of wrinkled depressions formed by tension in the thread are disposed along the grain surface of the work piece between the enlargements opposite the surface at which the threads are exposed.

4. A two-thread lock stitch moccasin type seam, as in claim 1, in which the work piece is provided with finished grain and unfinished felted surfaces and the enlargements are formed along the felted surface.

5. A method of inserting a two-thread lock stitch moccasin type seam, the threads of which enter and emerge from the same side of a piece of work material while being concealed at the other side, comprising the repeated steps of forming the work piece into an angular bend, splitting from the main body of the work piece shallow bridges running parallel to the length of the bend, each bridge being formed with a flat cut extending in a curved path to clear the inside surface of the bend in the work piece but terminating in aligned slits outside the bend, drawing a first loop of thread with parallel portions lying in side-by-side relation through each cut and interlocking the first loop with a second thread outside the cut, in combination with the step of retracting the first loop into the cut beneath the bridge after being interlocked by the second thread until the interengaging portions of both threads are brought into centralized positions beneath the width of each bridge.

6. A method of inserting a two-thread lock stitch moccasin type seam, as in claim 5, in which the angular bend in the work piece is straightened out to produce a row of enlargements beneath the central exposed areas of the bridges and depressions between the bridges.

7. A method of inserting a two-thread lock stitch moccasin type seam, as in claim 6, in which the tension in the thread, as the angular bend is straightened out produces a row of depressions at both sides of the work piece, each depression at one side being directly opposite the depression at the other side.

8. A method of producing a shoe having an ornamental design in its upper, including preparation of the upper with an angular bend, gripping the bend securely along a line to be ornamented and inserting a thread seam along the bend, the threads of which enter and emerge from the outer surface of the bend without intersecting the inner surface of the upper, in combination with the step of straightening out the bend for tensioning the threads of the seam to produce rows of depressions at least at one side of the upper before incorporating it in the shoe.

9. A method of inserting a two-thread lock stitch moccasin type seam, the exposed threads of which enter and emerge from the same side of a piece of work material while being concealed from view at the other side, comprising the steps of forming in the work piece an angular bend, splitting from the main body of the work piece a shallow bridge running parallel to the length of the bend with a flat cut extending clear of the work piece surface inside the bend but terminating in slits exposed outside the bend, drawing a first loop of thread with parallel portions lying in side-by-side relation through the cut and interlocking the first loop with a second thread outside each slit, in combination with the step of retracting the first loop into the cut beneath the bridge after being interlocked by the second thread with the interengaging portions of both threads brought into a centralized position beneath the width of the bridge.

10. A method of inserting a two-thread lock stitch moccasin type seam, as in claim 9, in which the same thread is brought into parallel relationship with itself inside each slit, each point of interengagement with the other thread produces an enlargement along the central exposed area of each bridge and the threads are tensioned to produce a depression between each pair of enlargements at the opposite side of the material.

References Cited by the Examiner

UNITED STATES PATENTS

| | | | |
|---|---|---|---|
| 1,521,853 | 1/25 | Augustine | 112—62 X |
| 1,920,554 | 8/33 | Grams | 12—142 |
| 2,207,977 | 7/40 | Finn | 12—142 |
| 2,696,795 | 12/54 | Kirsch | 112—262 |
| 2,818,040 | 12/57 | Krohn | 112—262 |
| 3,126,853 | 3/64 | Maves | 112—421 |

FOREIGN PATENTS 306,273   3/33   Italy.

JORDAN FRANKLIN, Primary Examiner.

THOMAS J. HICKEY, DAVID J. WILLIAMOWSKY,
Examiners.